(12) United States Patent
Judd et al.

(10) Patent No.: US 10,616,406 B1
(45) Date of Patent: Apr. 7, 2020

(54) AUTOMATED COGNITIVE ASSISTANCE SYSTEM FOR PROCESSING INCOMING ELECTRONIC COMMUNICATIONS WITH CONTEXTUAL INFORMATION

(71) Applicant: INTERNATIONAL BUSINESS MACHINES CORPORATION, Armonk, NY (US)

(72) Inventors: Ross Judd, St. Leonards (AU); Thomas E. Creamer, Boca Raton, FL (US); Sumit Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/155,290

(22) Filed: Oct. 9, 2018

(51) Int. Cl.
| H04M 3/42 | (2006.01) |
| H04M 1/725 | (2006.01) |
| G06F 16/27 | (2019.01) |
| G06F 16/25 | (2019.01) |
| G06F 16/9535 | (2019.01) |

(52) U.S. Cl.
CPC ...... H04M 3/42042 (2013.01); G06F 16/258 (2019.01); G06F 16/27 (2019.01); G06F 16/9535 (2019.01); H04M 1/72527 (2013.01); H04M 1/72566 (2013.01)

(58) Field of Classification Search
CPC .............. H04M 3/42; H04M 3/42042; H04M 1/72566; H04M 1/72527; G06F 16/9535; G06F 16/258; G06F 16/27
See application file for complete search history.

(56) References Cited

U.S. PATENT DOCUMENTS

| 8,532,631 | B2 | 9/2013 | Krishnamurthy | |
| 8,965,348 | B1* | 2/2015 | Cronin | H04W 4/21 |
| | | | | 455/414.1 |
| 2006/0136424 | A1* | 6/2006 | Nuggehalli | G06F 3/1222 |
| 2007/0121916 | A1* | 5/2007 | Wang | H04M 1/72519 |
| | | | | 379/373.01 |
| 2007/0135110 | A1 | 6/2007 | Athale | |
| 2013/0156171 | A1* | 6/2013 | Springer | H04M 1/64 |
| | | | | 379/88.22 |

(Continued)

FOREIGN PATENT DOCUMENTS

| WO | 2012063260 A2 | 5/2012 |
| WO | 2012064990 A1 | 5/2012 |

*Primary Examiner* — Christopher M Brandt
(74) *Attorney, Agent, or Firm* — Schmeiser, Olsen & Watts; Aaron Pontikos

(57) ABSTRACT

A system and method for processing an electronic communication comprise receiving, by a communication processing system, data regarding an incoming communication output from a computing device of a communication initiator and directed to a computing device of a communication recipient; performing a data search, by the communication processing system of one or more data sources for context information regarding at least one of the communication initiator or the communication initiator; aggregating, by the communication processing system, collected context information in response to performing the data search; and generating and formatting contact context data from the collected context information for output to the computing device of the communication recipient.

19 Claims, 8 Drawing Sheets

(56) References Cited

U.S. PATENT DOCUMENTS

| | | | |
|---|---|---|---|
| 2013/0195258 A1* | 8/2013 | Atef | H04L 67/34 379/88.01 |
| 2016/0036969 A1* | 2/2016 | Kau | H04M 3/42221 379/85 |
| 2016/0316349 A1* | 10/2016 | Lee | H04W 4/16 |
| 2017/0041462 A1 | 2/2017 | Rensburg | |
| 2017/0111498 A1* | 4/2017 | Cody | H04M 3/42059 |
| 2017/0331949 A1 | 11/2017 | Boss | |
| 2018/0103137 A1* | 4/2018 | Reddy | H04M 1/274516 |
| 2018/0359347 A1* | 12/2018 | Karkkainen | H04M 1/57 |

\* cited by examiner

AUTOMATED COGNITIVE ASSISTANCE SYSTEM FOR PROCESSING INCOMING ELECTRONIC COMMUNICATIONS WITH CONTEXTUAL INFORMATION

BACKGROUND

The present invention relates to electronic communication processing, and more specifically, to automated multi-input systems and methods for processing incoming electronic communications with contextual response data so that a communication receiver such as a telephone call receiver, or recipient, receives in advance a set of information regarding the initiator's intention.

Modern real-time interactions include the use of technology ranging from conventional telephones to multimedia communications devices such as smartphones, which permit initiators and recipients to communicate remotely via a communications network.

SUMMARY

An embodiment of the present invention relates to a method for processing an electronic communication, comprising: receiving, by a communication processing system, data regarding an incoming communication output from a computing device of a communication initiator and directed to a computing device of a communication recipient; performing a data search, by the communication processing system of one or more data sources for context information regarding at least one of the communication initiator or the communication recipient; aggregating, by the communication processing system, collected context information in response to performing the data search; and generating and formatting contact context data from the collected context information for output to the computing device of the communication recipient.

Another embodiment of the present invention relates to a method for processing an electronic communication, comprising: receiving, by a communication processing system, data regarding an incoming communication output from a computing device of a communication initiator and directed to a computing device of a communication recipient; performing a data search, by the communication processing system of one or more data sources for context information regarding at least one of the communication initiator or the communication recipient; aggregating, by the communication processing system, collected context information in response to performing the data search; populating a data record including contact context data of the aggregated context information; and sharing contents of the data record with the computing device of a communication recipient and with at least one other computing device, each of the computing device and the at least one other computing device having a different display requirement, and each receiving the shared contents of the data record according to the different display requirements.

Another embodiment of the present invention relates to a computer system, comprising: a processor; a memory device coupled to the processor; one or more remote computer servers in communication with the processor; and a computer readable storage device coupled to the processor, wherein the storage device contains program code executable by the processor via the memory device to implement a method processing an electronic communication, comprising: receiving, by a processor, data regarding an incoming communication output from a computing device of a communication initiator and directed to a computing device of a communication recipient; performing, by a processor, a data search of one or more data sources for context information regarding at least one of the communication initiator or the communication initiator; aggregating, by a processor, collected context information in response to performing the data search; and generating and formatting by a processor contact context data from the collected context information for output to the computing device of the communication recipient.

Another embodiment of the present invention relates to a computer program product, comprising a computer readable hardware storage device storing a computer readable program code, the computer readable program code comprising an algorithm that when executed by a computer processor of a computer system implements a method for processing an electronic communication, comprising: receiving data regarding an incoming communication output from a computing device of a communication initiator and directed to a computing device of a communication recipient; performing a data search of one or more data sources for context information regarding at least one of the communication initiator or the communication initiator; aggregating collected context information in response to performing the data search; and generating and formatting contact context data from the collected context information for output to the computing device of the communication recipient.

DETAILED DESCRIPTION

Figure 1:
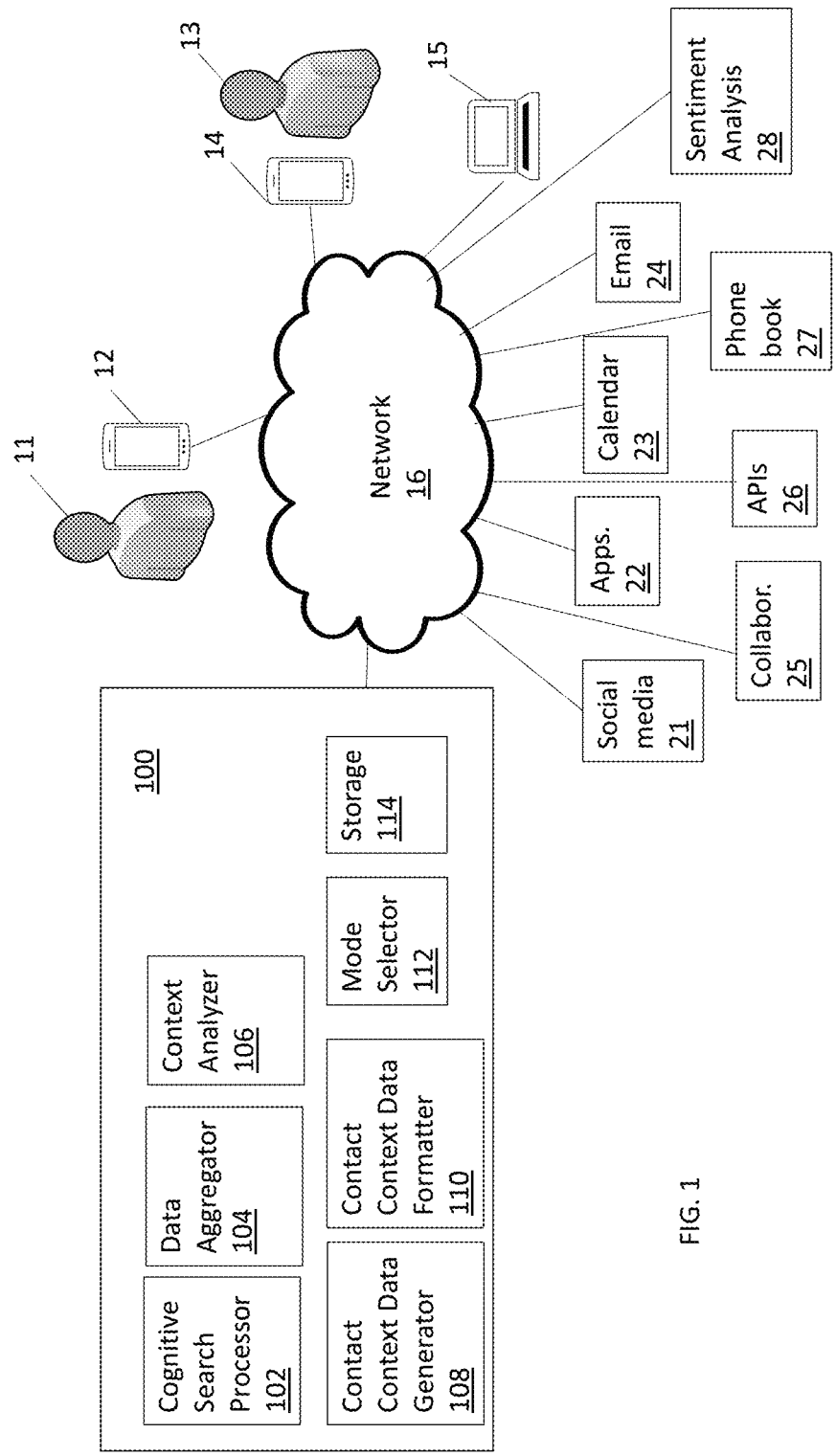
FIG. 1 is a diagram of a computing environment in which a call processing system operates, in accordance with embodiments of the present invention.

Embodiments of the present invention recognize that a recipient of a phone call desires to be informed in advance of a call initiator's intention, motive, or state-of-mind in advance of responding to the incoming call so that the recipient can make an informed decision whether to answer the call.

In brief overview, embodiments of the present inventive concepts describe a system and method for providing a receiver of a phone call, or a digital communication such as a voice over IP (VoIP) or real-time video communication with contextual information, which can provide the recipient with a proactive understanding of the reason for the call, the emotional state of the communication initiator (also referred to as the initiator), and/or other information that may be useful to the recipient so that the recipient can make an informed decision whether to answer the call or otherwise be prepared to address the anticipated subject of the digital interaction. In some embodiments, the system and method collect contact context data relevant to the understanding for the reason for the call from multiple data sources prior to and/or during the call, and aggregated and analyzed to offer the recipient with clues or overt information or estimation about the subject of the attempted telephony interaction and provide a complete context for reasons for the inbound call or related electronic communication. The collected context data, referred to as aggregated data, provides for an automatically prompt before receiving an incoming digital interaction. For example, the system can identify a potential initiator from a calendar, to-do lists, and so on which the system analyzes in advance of an expected interaction with the potential initiator and presented to the recipient on the recipient's smartphone or other computer display.

In some embodiments, the recipient's smartphone or programmable mobile phone displays the contact context data according to a particular format, for example, including a reduced subset of the available contact context data. In addition, a different computer than the recipient's smartphone receives the contact context data expanded to a different format, for example, to display all of the available contact context data.

Another feature is that the automated cognitive assistance system and method can operate in one or more different modes of operation, including but not limited to a proactive mode where predictions are made about a call, a real-time mode which includes real-time information about a current call, and/or a share mode where multiple electronic devices are synchronized to collectively receive and display call information.

A feature regarding the presentation of contextual information in this manner is that the presentation provides real-time and legitimate guidance to the communication receiver about the communication initiator and/or adds context of the incoming call, especially where a risk where an illicit or unscrupulous party executes a call, text, or email spoofing, which in the absence of such information can otherwise confuse the communication receiver as to the actual identity of the communication initiator. The contextual information provided with or in advance of the incoming call minimizes or eliminates the need for the communication receiver to independently search for information from the calling party number or to conclude from the incoming call identity, i.e., states "restricted" instead of presenting a phone number, whether the incoming call will be acceptable to the communication receiver. The recipient having access to the displayed context information permits that recipient to determine whether or not the answer calls that are important to him or her, while ignoring calls that he or she is not interested in answering at the moment.

FIG. 1 is a diagram of a computing environment in which a call processing system 100 operates, in accordance with embodiments of the present invention.

The call processing system 100 facilitates a voice and/or data communication between an initiator's computing device 12 and a recipient's computing device 14. The call processing system 100 may exchange data and otherwise interoperate with a communications network 16 that provides a data exchange path providing for the transfer, routing, or other exchange of an incoming communication from the mobile electronic devices 12, 14. Examples of a communication network 16 may include, but are not limited to, a public switched telephone network (PSTN) (e.g., an analog landline network of telephones, a cellular network for mobile devices, or communication satellites), a wireless network, a data communication network, e.g., a local area network (LAN) or a wide area network (WAN), or a combination thereof. Although a communication network 16 is referred to throughout the figures, the two mobile electronic devices 12, 14 may exchange data directly with each other, for example, via a direct electronic connection. Although mobile electronic devices 12, 14 are described, embodiments herein can apply to any computing device that is constructed and arranged to exchange voice, video, data, and/or other electronic communication with another computing device.

In some embodiments, as shown in FIG. 1, the call processing system 100 includes a cognitive search processor 102, a data aggregator 104, a context analyzer 106, a contact context data generator 108, a contact context data formatter 110, a mode selector 112, and a storage device 114. The call handling system 100 electronically stores and executes some or all of these elements at the computer system 500 described with reference to FIG. 6, and/or other computer devices in communication with the computer system 500 via the communication network 16 or direct connection. In some embodiments, some or all of the cognitive search processor 102, data aggregator 104, context analyzer 106, contact context data generator 108, contact context data formatter 110, mode selector 112, and storage device 114 can be part of or otherwise communicate with other communication processing systems such as email servers, instant messaging systems, social network communications, and so on.

The cognitive search processor 102 searches for and processes contextual data about the contact initiator 11 to determine whether any relevant clues may be derived about the subject of the digital interaction and intent of the call made by the initiator 11. The cognitive search processor 102 is configured to receive and process data from various data sources such as but not limited to social media 21, data applications 22, electronic calendars 23, electronic messaging 4 such as email or a messaging service, collaboration tools 25, application programming interfaces (APIs) 26, electronic phonebooks 27, sentiment analysis devices 28, and/or other data sources, such as cognitive computing or artificial intelligence systems.

In some embodiments, the cognitive search processor 102 performs a data search in response to the recipient's computing device 14 receiving the incoming call, where the calling party ID of the initiator or other identifier provided with a data packet with the incoming call request is used to launch the contextual data search. In other embodiments, the cognitive search processor 102 performs this data search prior to any incoming call from the initiator, for example, by retrieving the initiator's information from a contact list or the list stored at the recipient's computing device 14 or other electronic data repository determined to be used by the recipient 13. In some embodiments, the cognitive search processor 102 monitors actions performed by the initiator 11 and stores data regarding these actions at the storage device 114 for future processing. For example, the cognitive search processor 102 can monitor the use of a call list according to a plurality of predetermined criteria to predict when a subsequent call is to be made. In another embodiment, monitoring may occur in real-time during a call between initiator 11 and recipient 13, where the search processor 102 can detect that the initiator 11 or recipient 13 searches an online calendar or other application. In another embodiment, the search processor 102 detects that the initiator 11 sent an electronic calendar invite request to the recipient 13 has not yet responded to, which provides for cognitive data for predicting that the initiator 11 may call the recipient 13.

The data aggregator 104 extracts and organizes the contextual data retrieved by the cognitive search processor 102 to build one or more aggregated data stores including a set of records and prepare pre-organized and relevant information that is organized and sorted by specific attributes that contains quantitative data and qualitative data, which the context analyzer 106 utilizes to perform cognitive or sentiment analytics or other data analysis, for example, sentiment analysis, emotion artificial intelligence, opinion mining, and so on, to determine possible reasons for an incoming call to the intended recipient 13. In some embodiments, a remote computing system performs cognitive analytics or the like and outputs results to the data aggregator 104 and/or context analyzer 106. For example, the cognitive search processor 102 can extract structured data from web pages by crawling, finding, extracting, normalizing and classifying content from web pages, rating social networking information from social networking services by crawling, finding, extracting, rating and classifying content from social networking services, and the data aggregator 104 can merge both sets of data in a data store at the storage device 114. In a more detailed example, the cognitive search processor 102 can crawl a social site or uses a data feed to retrieve and analyze messages in social media message postings for relevant information used to establish a possible state of mind of the initiator 11 and/or recipient 13.

The data aggregator 104 can aggregate the data for automatically prompting of the data before the communication receiver 13 receives the incoming digital interaction. For example, the system 100 recognizes the incoming initiator's identity and presents the aggregated information prior to the recipient 13 "accepting" the digital interaction rather than prior to the recipient 13 receiving the incoming call, e.g., when hearing the phone "ring" or output other sounds construed by the recipient 13 as being ring tones.

The context analyzer 106 can establish an inference of relationships, similar interests, or other common areas between the initiator 11 and recipient 13, by matching initiator data and recipient data aggregated by the data aggregator 104. In particular, the context analyzer 106 infers the reason for an incoming call from the initiator 11 to the recipient 13 and generates an explanation for the incoming call which can be part of the context data displayed at the recipient's computing device 14.

Figure 5:
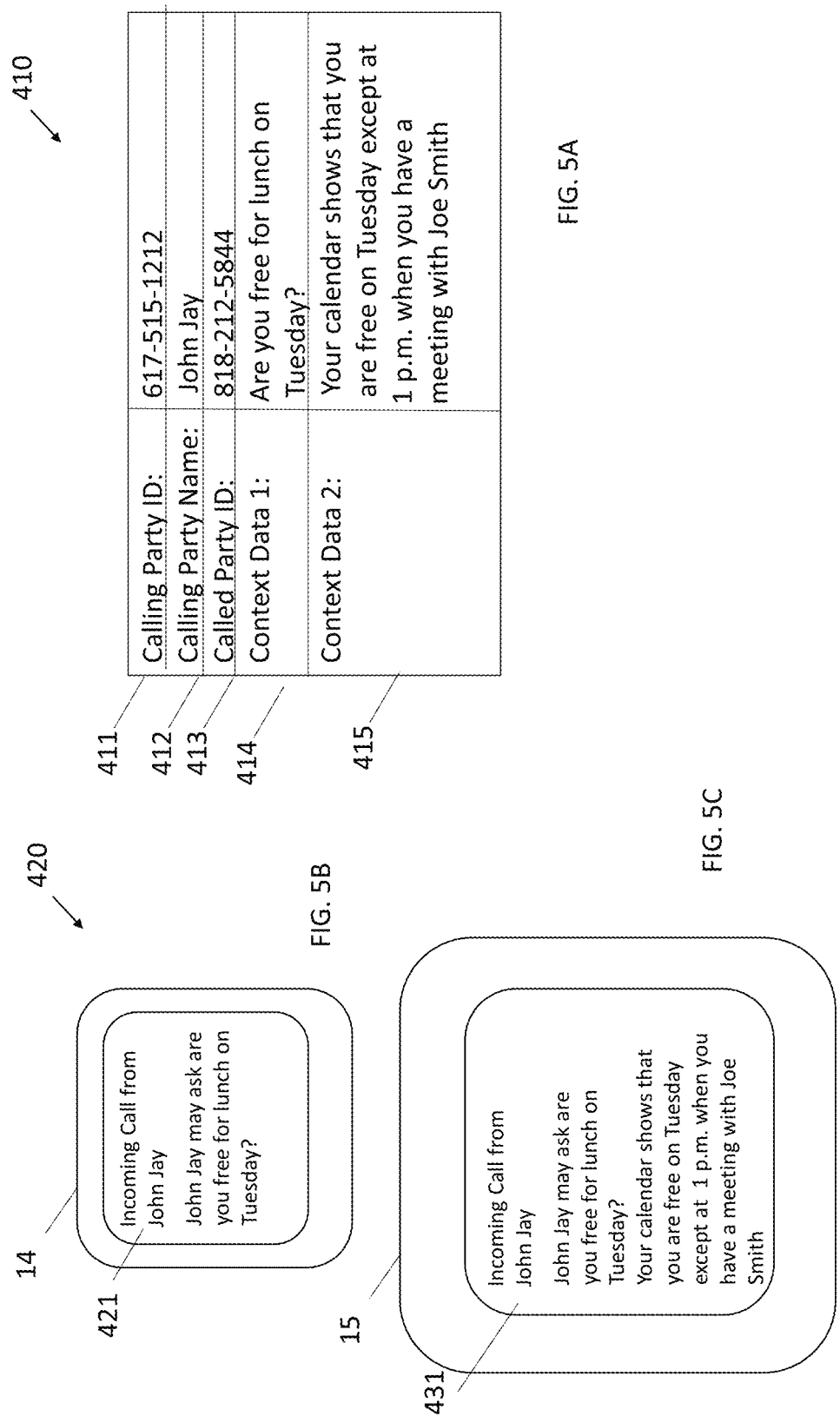
FIG. 5A illustrates an example of a data record including aggregated context data, in accordance with embodiments of the present invention.
FIGS. 5B and 5C are screenshots of graphical user interfaces (GUI) of a smartphone displaying short content context data and a separate larger display of an electronic computing device displaying long content context data, respectively, of the data record of FIG. 5A, in accordance with embodiments of the present invention.

The contact context data generator 108 populates a contact record 410 with relevant context data for display, for example, shown in FIG. 5A. In some embodiments, the contact context data generator 108 generates long content context descriptors or related data, for example, fields 414, 415, 416, 417, 418 shown in FIG. 5A, which the mode selector 212 outputs to a different electronic display device 15 than the computing device 14 receiving the call.

The contact context data formatter 110 can determine which context data fields 414, 415, 416, 417, 418 to be displayed depending on the type of display, whether the receiving device functions as a telephone, i.e., allows real-time video and/or voice to be processed and exchanged, and so on, or whether the display device has a passive function, such as display 15. For example, the contact context data formatter 110 can generate a reduced set of content from the record 410, formatting the content for display on the smaller display of the computing device 14. In some cases, the contact context data formatter 110 can remove text and/or graphics from a larger compilation of data aggregated by the data aggregator 104 so that an abridged version of the large content context data is displayed, as shown in FIG. 5B. Time may be of the essence since the communication recipient must make a relatively quick decision whether to accept the incoming phone call after viewing the context data on the display, so concise, relevant, and sufficient context data is required for display on the computing device 14, and the larger display 15 displays the details not displayed on the smaller computing device 14.

Figure 3:
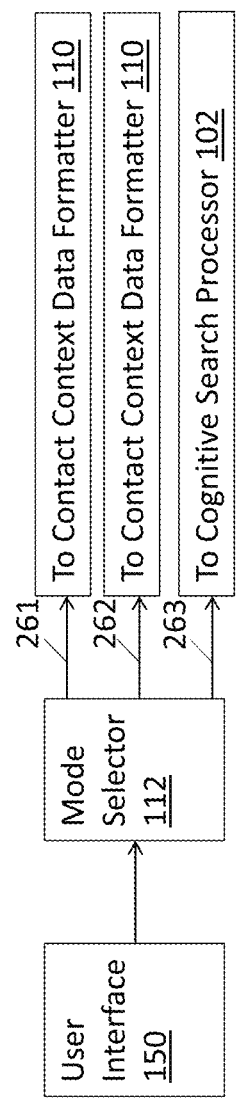
FIG. 3 is a block diagram of an operation of a mode selection switch, in accordance with embodiments of the present invention.

The mode selector 112, as shown in FIGS. 1 and 3, permits the call processing system 100 to operate in one or more different modes of operation, such as a proactive mode, a real-time mode, and a share mode, each described below. In some embodiments, the user's computer display displays an electronic button, icon, or the like, for example, a user interface 150 of the recipient's computing device 14, which provides the user with the ability to switch between the available modes of operation by communicating with the mode selector 112.

The storage device 114 is constructed and arranged to store data collected from the various data sources 21-27 for providing context to an incoming call for use in subsequent calls from a particular initiator 11. The storage device 114 includes a data repository that may be written to and/or read by contact records 410. In an embodiment, the storage device 114 stores data such as, but not limited to, user preferences, contacts which may be retrieved from the computing device 14 or other contact data source. In other embodiments, the storage device 114 may reside on another server, or another computing device, provided that the storage device 114 is accessible.

The call processing system 100 modifies the stored data corresponding to a particular initiator or receiving recipient when a cognitive analysis reveals a change in state of the initiator 11. For example, the recipient 13 may receive a phone call from the initiator 11 on a particular day during which the initiator 11 is sad. The cognitive search processor 108 may reveal that on this day the initiator 11 experienced a death in the family by aggregating information from the initiator's social media website. Here, the system 100 recognizes the recipient's social network due to the collection of data recognizing the data sources that the recipient 13 has previously accessed or otherwise has access to, such as knowledge that the initiator 11 is an existing part of the recipient's social network. The system 100 may determine the source of such information by recognizing or otherwise accessing an IP address, uniform resource location (URL), and so on, or performing an online search for the initiator's name and automatically analyzing the results for context data, or by recognizing that different sources of information have different relevance or confidence levels that can be weighted, analyzed, and so on for predicting that a particular initiator 11 is to place a call to the recipient 13. This collected data can be stored at the storage device 11 for future reference. However, two weeks later the same initiator 11 may call the recipient 13 with a different intent or state of mind. For example, in this subsequent call, the cognitive search processor 108 reveals that the initiator 11 is getting married and likely wants to share this good news with the recipient 13. This different emotional state of the initiator may be determined from new data, and likewise stored at the storage device 11. Thus, all available data that is determined to be relevant to the initiator 11 and/or recipient 13 can be stored, such as previous interactions, initiator location profiles, social media posts, email subject lines, and so on, which can be stored locally at the storage device 11, similar to the buffer or cache of a computer, so that fewer data exchanges are required over the network 16, which permits the call processing system 100 to operate with reduced bandwidth and data consumption requirements because there is no need to perform repetitive searches for the same or similar context data. since the data is stored locally.

Figure 2:
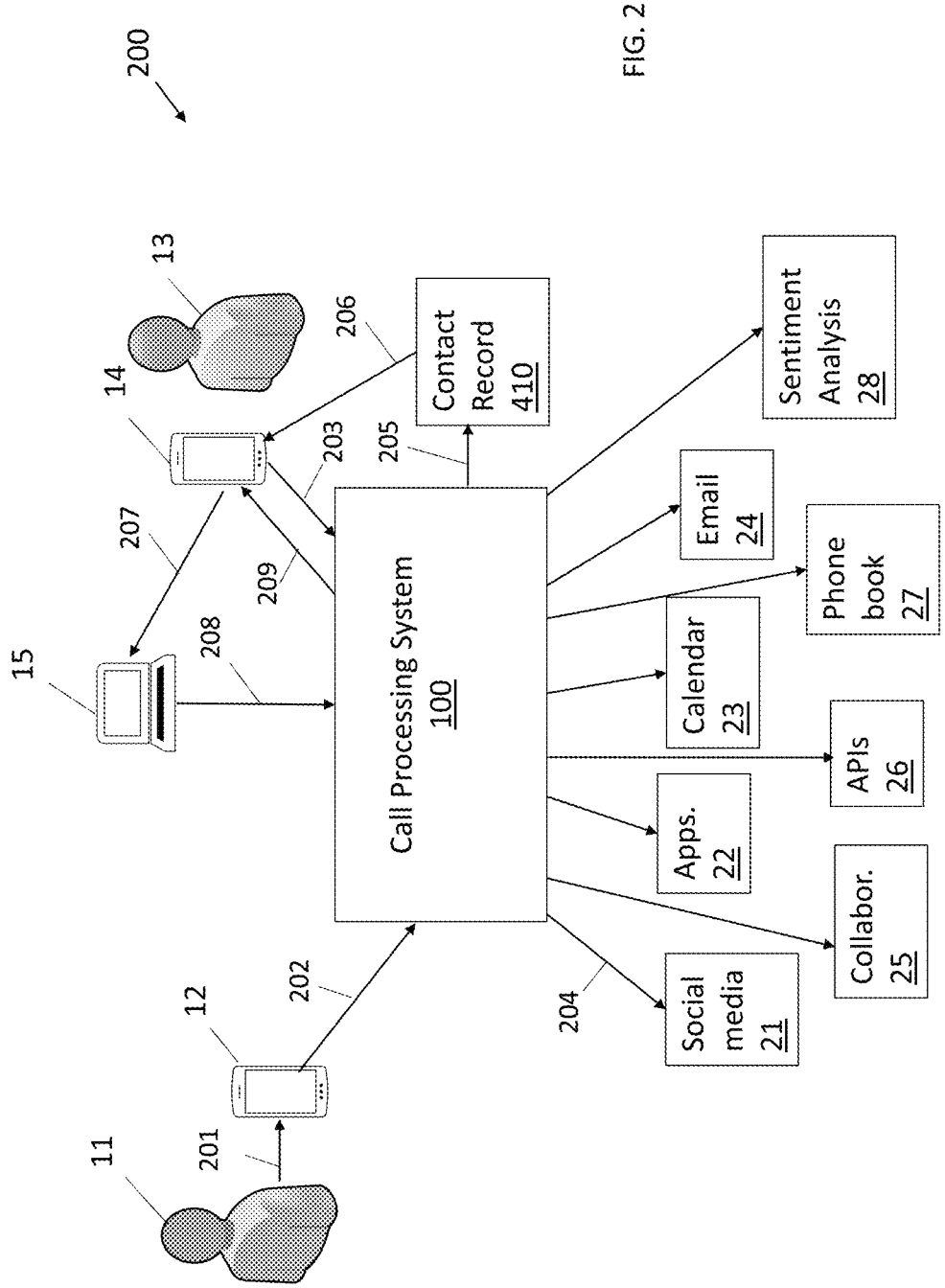
FIG. 2 is a diagram illustrating an exchange of data between elements of a call processing system for processing incoming calls with contextual response data, in accordance with embodiments of the present invention.

FIG. 2 is a diagram illustrating an exchange of data between elements of the call processing system 100 of FIG. 1 for processing incoming calls with contextual response data, in accordance with embodiments of the present invention.

At step 201, a communication initiator 11, also referred to as a contact or communication initiator, uses its computing device 12 to initiate an electronic communication, e.g., a phone call, with the computing device 14 of a communication recipient 13, also referred to as a contact or communication receiver or recipient, via the communication network 16. The contact initiator 11 can execute the call by entering the communication recipient's phone number, IP address, email address, and so on, or using a call directory displayed on the computing device 12 to execute a request for initiating a call. In some embodiments, a call is automatically initiated. For example, a third-party service such as a "robocall service" or marketing firm initiates a call, and human agents are automatically connected with communication receivers.

At step 202, the call processing system 100 receives and processes information details regarding the communication initiator 11 and/or the recipient 13. In some embodiments, the call processing system 100 receives a data communication from the recipient's computing device 14 in response to receiving an incoming call from the communication initiator's computing device 12. The received information details may include but not be limited to phone number, social media identification, application capabilities, and so on. In some embodiments, a stored electronic address book or other repository stores contact information, which the system 100 retrieves for processing. The information details are provided by the incoming call record from the initiator's computing device 12, and may be determined by comparing data received after the initiates places the call, such as the communication initiator's calling party identification (ID), the called party ID, which may include phone numbers, internet addresses, messaging identifiers, or other information that distinguishes the initiator's computing device 12 and recipient's computing device 14 from other mobile devices.

At step 203, the recipient's computing device 14 outputs to the call processing system 100 at least the identity provided by the initiator 11. The call processing system 100 in response determines from the received information the initiator's identity for subsequent cognitive searches.

The system 100 uses the provided recipient identifier, e.g. a phone number, to interrogate other systems to gather more information on the actual identity. For example, an electronic phone book or other contact listing includes the phone number as well as other information such as the email address, social media handle, etc. The recipient's phone number in this example is compared to the contents of the electronic phone book or other contact listing. When a match is found between the recipient's phone number and the stored phone number, then the system 100 retrieves the email address, social media handle, etc. for searching the contents of other data repositories for additional information.

At step 204, the call processing system 100 interrogates available data sources in order to collect context information about the contact initiator 11, the contact receiver 13, and/or possible reasons for the call. Possible data sources may include but not limited to social media 21, applications 22, electronic calendars 23, electronic messaging (email) 24, collaboration tools 25, application programming interfaces (APIs) 26, electronic phonebooks 27, sentiment analysis 28, and/or other data sources such as an electronically stored to-do list, initiator location profiles. Although FIGS. 1 and 2 illustrate these data sources at remote or third-party locations, in some embodiments, some or all of these data sources may be stored and electronically processed by the communication recipient's computing device 14 or other local computing device.

At step 205, the call processing system 100 generates a contact context record from the data collected in step 204. In some embodiments, as shown in FIGS. 5A-5C, the contact context data formatter 110 generates a set of short contact context data from a contact record 410 for displaying the data on the recipient's computing device 14. In other embodiments, the entire contents of the contact record 410 are displayed as long content context data at a different electronic display 15.

At step 206, the system 100 outputs the short contact context data formatted from the contact record 410 to the communication recipient's computing device 14, and subsequently provided to an application executed by a hardware processor the computing device 14 and displayed at the device's display screen. In some embodiments, the executed application is a phone application, or another contact application constructed and arranged to process received voice, video, and/or other multimedia data, including text from the contact context data. The short contact context data is displayed in an initiator ID field or the like configured to display data on the computing device 14. In some embodiments, although short contact context data is displayed, the computing device 14 may include an activation button or the like that when selected can display the long content context data, for example, the contents of the entire record 410 shown in FIGS. 5A and 5C. Since the mobile device display may not be large enough to display all of the context data, the font, image size, etc. may be reduced, or a scrolling feature may be provided so that the viewer can scroll through the display to view the long content context data.

At step 207, the mode selector 212 transfers contact context data to a different computing device 15, for example, a computing device having a display large enough to accommodate the contents of a large contact context. The call processing system 100 may include an application that executes on a mobile electronic device, a larger computer, or both. Accordingly, the transfer of contact context data may include a pause in the exchange or sharing of information on the phone and to continue to share at least the same information on the larger device. In some embodiments, a session ID or the like facilitates the transfer. The feature of displaying contact context data on a larger screen, or distributed on multiple devices, permits the contact receiver 13 to more effectively handle an incoming call since the viewer can quickly react to the information displayed in this manner. Also, the transferred contact context can be viewed by the contact receiver 13 on the separate device 15 to be provided with more viewing options. Accordingly, the contact context data received by the destination mobile device can be shared with another device such as a laptop computer or the like while operating both devices. For example, the recipient 13 may talk on the computing device 14, while viewing the relevant additional details of the call, i.e. prompts, guidance, background) that are presented on a different computer such as a tablet, laptop, etc. In some embodiments, context data on a mobile electronic device may include background information associated or liked to a unique session identification or the like. Here, when the context data is viewed on the other device 15, i.e., shared context data, the system 100 uses the same unique session identification is used to process the data so that the same information can be displayed on the other device.

At block 209, the recipient 13 can receive additional information from the call processing system 100. For example, the contact receiver 13 may request clarifying information regarding a displayed statement on the computing device 14 that the initiator 11 is calling because the initiator 11 is looking for information. This general inquiry by the initiator 11 may be substantiated by details collected from social media postings by the initiator 11 that the initiator is searching for a former roommate, and this additional contextual information can be provided to the recipient 13 if the recipient 13 submits a request, for example, by selecting a button, icon, tab or the like displayed on the recipient's computing device 14 that when activated provides this additional contextual information. This additional information, e.g., prompts, recommendations, background information, and so on, can be displayed on the recipient's computing device 14 and/or synchronized tablet, notebook, or another computer 15 in real-time or near real-time while the initiator 11 and initiator 13 are speaking in the phone call.

FIG. 3 is a diagram of a computing environment in which the call processing system 100 of FIG. 1 operates according to different modes of operation, in accordance with embodiments of the present invention. The mode selector 112 distinguishes between the various modes, including a proactive mode where predictions are made about a call, a real-time mode which includes real-time information about a current call, and/or a share mode where multiple electronic devices are synchronized to collectively receive and display call information.

As previously described, when the initiator's computing device 12 initiates a voice communication with the recipient's computing device 14, a real-time or near real-time data communication is established between the recipient's computing device 14 and the call processing system 100. Here, the user interface 150 of the recipient's computing device 14 may display options, include an option whether the recipient wishes to receive real-time or near real-time context data regarding the current call via the aggregation of relevant information based on the call context, such as the initiator's identity and associated information. If a user selects this option, then the mode selector 112 outputs a data command 261 to the contact context data formatter 110 which controls the output of the context data, for example, executed in step 206 or 209 in FIG. 3. In other embodiments, the system 100 executes this step automatically, with no recipient selection from the user interface.

In some embodiments, the information in the contact record 410 for display is limited to private information which was publicly available about the other party and relevant to the current interaction. For example, context data provided to the communication receiver 13 may include private information about the recipient 13 such as an electronic calendar including the recipient's personal schedule as well as public information about the communication initiator 11 such as a social media posting of the initiator's birthday, which may be determined by the content analyzer 106 to be a reason for the call initiated by the initiator 11.

The call processing system 100 determines from the received information the communication recipient's identity for subsequent cognitive searches. After a profile is established, the system 100 uses the profile as a basis on which to add other information. Also, the system 100 can use the profile as reference data, for example, to establish the last time that the initiator 11 called the recipient 13 to discuss a particular topic.

The recipient 13 from the user interface 150 may view a prompt to select the option of a share device mode, which when selected via a button, icon, or the like on the user interface 150 outputs a data command 262 to synchronize the computing device 14 with another computer 15, for example, with a larger display screen to enable more convenient viewing. In some embodiments, the mode selection module 212 outputs a command, signal, or other data to the computing device, which in response provides the option on the user interface 150. For example, the recipient 13 may find that the short version of the information in the contact record 410 is vague and desires more data. Here, the entire contents of the record 410 may be output to the other computer 15 via a local communication path for executing, a network connection. In some embodiments, an extension to context prompts may be provided, and may be agnostic or independent of ecosystem, device manufacturer, operating system, or service provider so that any computing device 14 can initially be part of a communication which can be transferred to a different device 15 to continue with the same continuation, regardless of ecosystem, device manufacturer, operating system, or service provider. In other embodiments, the system 100 executes this step automatically, with no recipient selection from the user interface 150, for example, where the detailed context data is auto-routed to the other computer 15 when the system 100 establishes that the smaller display screen of the mobile 14 is insufficient for displaying the entirety of the contact record 410.

The recipient 13 from the user interface 150 may also be prompted to select the option of a proactive mode, which when selected via a button, icon, or the like on the user interface 150 outputs a data command 263 to instruct the cognitive search processor 102 to proactively identify the potential for an upcoming contact and interrogate available data sources to generate or update a contact record 410. In other embodiments, the cognitive search processor 102 executes the proactive feature automatically, with no recipient selection from the user interface.

Figure 4:
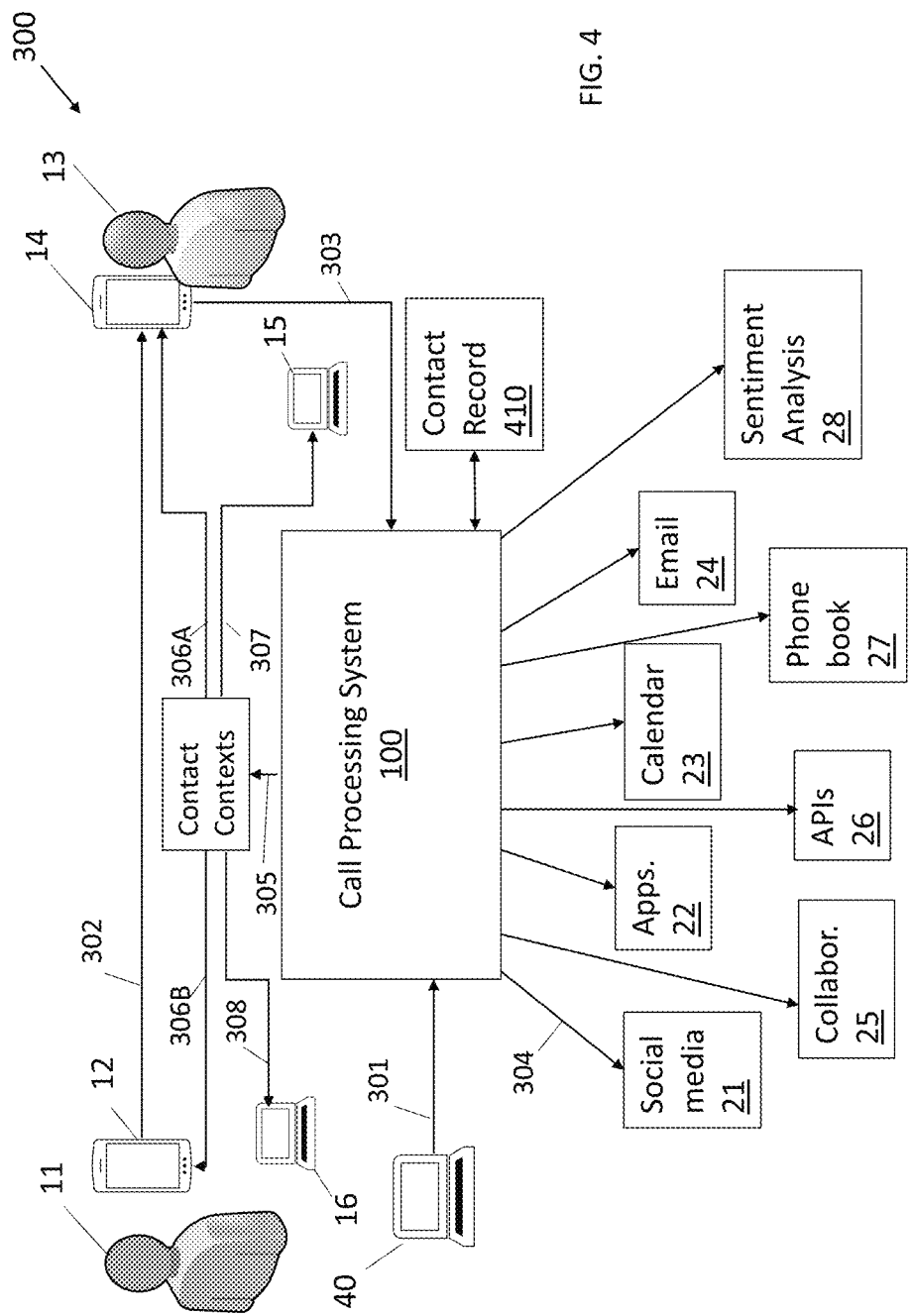
FIG. 4 is a diagram of a computing environment in which a call processing system operates, in accordance with embodiments of the present invention.

FIG. 4 is a diagram of a computing environment 300 in which a call processing system operates, in accordance with embodiments of the present invention. At least some of the elements of the computing environment 400 may be similar to or the same as those of the computing environment 200 of FIG. 2 and may include the mode selection features described in FIG. 3.

At step 301, the call processing system 100 receives a request, for example, from an operator computer 40, to operate in a proactive mode, for example, receiving a data command 263 in FIG. 3 to proactively identify the potential for an upcoming contact and interrogate available data sources, for example, via a network 16 to generate or update a contact record 410. For example, the mode selector 112 may activate a predictive or cognitive analysis application, which in turn retrieves call history data from the recipient's computing device 14 and/or other data sources 21-28 to establish a high probability of a call in the near future from the initiator 11. In response, a preemptive search can be performed by the cognitive search processor 102 and/or data aggregator 104 to identify context-related data that the system 100 may store, process, and convert to text, which the recipient's computing device 14 displays if or when the communication initiator 11 places the call to the recipient 13.

At step 302, the contact initiator 11 uses its computing device 12 to initiate an electronic communication, e.g., a phone call, with the computing device 14 of the recipient 13 via the communication network 16. Step 302 is performed after step 301 in order for the proactive mode to operate properly. Step 302 may be similar to step 201 and/or 202 of FIG. 2. For example, an electronic communication formed by the contact initiator's computing device 12, more specifically, a header of the message, can include the Calling Party Number (ID) and/or Calling Party Name (also referred to as an Initiator ID), Called Party Number (ID) and/or Called Party Name, call routing data, and so on. Details of similarities between the steps in FIG. 4 and those in FIG. 2 are not repeated due to brevity.

At step 303, the call processing system 100 receives information details regarding the initiator 11 and/or recipient 13.

The call processing system 100 determines from the received information the communication recipient's identity for subsequent cognitive searches.

At step 304, the call processing system 100 interrogates available data sources such as sources 21-28 of FIG. 1 to collect context information about the contact initiator 11, the contact receiver 13, and/or possible reasons for the call. For example, context information regarding a reason may include psychographic information of the initiator and/or recipient.

Step 304 may be similar to step 204 of FIG. 2. Details of such similarities are not repeated due to brevity. The call processing system 100 aggregates the retrieved information, and at step 305 generates contact context data for both the contact initiator 11 and the contact receiver 13. The contact context data formatter 110 can output the contact context data in a format for display on each of the mobile devices 12, 14. For example, the mobile device 12 can process a subset of the contact context data in order to comply with supported display features of the mobile device, for example, which may have a dimension such as height, width, surface area, etc. incapable of displaying all of the contact context data. Therefore, a computing device operated by a user can make available a set of small contact context data of the contact context data to prepare for or otherwise act with regard to a communication event.

At step 306A, the system 100 outputs a set of short contact context data formatted by the data formatter 110 from the collected context information to the computing device 14. A phone application or another contact application stored at and executed by the computing device 14 receives and processes the context information. In some embodiments, the computing device displays a button, icon or the like as an option for the user to see the expanded contact context, for example, to display long content context data, which derives from the same contact record 410 as the short contact context data.

At step 306B, the system outputs a set of short contact context data formatted by the data formatter 110 from the collected context information to the initiator's computing device 12, which a phone application or another contact application stored at and executed by the computing device 12 receives and processes. In some embodiments, the computing device 12 displays the short call context as reverse contact context data. Here, the system 100 outputs context data regarding the intended communication recipient 13 to the communication initiator's computing device 12, such as calendar availability, interests, affiliations, and so on. This may permit the initiator 11 to obtain information about the recipient 13, for example, the recipient is in the process of purchasing a car and does not wish to speak with sales people, or that the recipient is only interested in a particular make and model of a car. Other data aggregated after collected from various data sources may include publicly available information similar to information aggregated regarding the initiator, such as current location of the recipient 13, personal interests, and so on.

This information may include publicly and privately available about the communication recipient 13 and is relevant to the current interaction shared based on the recipient's permission. When operating in a reverse context mode, a security feature may be implemented, for example, requiring permission from the communication recipient 13 to share predetermined context data. In this example, if permission is not granted, then the communication initiator's computing device 11 only receives publicly available information. For example, a current communication between initiator and recipient may include a discussion about planning an upcoming meeting. Each of the initiator 11 and recipient 13 may display on their respective computing devices 12, 14 a personal calendar and so on. Each may also receive calendar information about the other. For example, the initiator 11 may see that the recipient 13 has a vacation planned on August 8, and even though the recipient 13 may be available on August 9, the initiator 11 may suggest a later meeting time such as August 12.

Accordingly, both a communication initiator 11 and receiver 13 can more effectively handle an incoming call with the availability to view both short and long contact context data.

In some embodiments, steps 302-306 are executed in a real-time mode activated by the mode selector 112.

At step 307, in a share-mode, the system 100 provides a set of long content context data to a different computing device 15 than the smartphone or other computing device 14 receiving the phone call, for example, a computing device, for example, a laptop computer or the like, therefore offering convenient viewing options for the recipient 13. The data formatter 110 or contact context data generator 108 may output the long content context data. In some embodiments, the system 100 controls the output of the content context data to the other computer device 15 in response to the recipient 13 selecting a button, icon, or the like from a user interface displayed on the recipient's computing device 14 receiving the call from the initiator 11. In some embodiments, some or all contact context data of the contact record 410 can be shared, duplicated, or otherwise similar or the same for both computing devices 14, 15 of the recipient 13. In some embodiments, contact context data is an extension of context prompts. For example, the initiator 11 may desire to request prior to a call or request during a call whether the recipient 13 is free at 1:00 PM on Tuesday for lunch. However, the recipient 13 may wish to see more information such as what part of town the initiator 11 will be in next Tuesday or whether there are potentially available timeslots, which can be answered by displaying the long context data.

At step 308, under a share mode of operation, a set of long content context data can be transferred to a different computing device 16 of the contact initiator 11, for example, a laptop computer or the like. The exchange or output of context data to the computing device 12 and/or other computing device 16 of the initiator 11 may be performed in a similar manner as that of the computing devices 14, 15 of the recipient 13.

At step 308, the communication initiator 11 or communication receiver 13 may request additional context data. Here, any of the user computing devices 12, 14, 15, or 16 may display a button, field, icon or the like on a user interface, which when selected outputs a data request to the call processing system 100, wherein the cognitive search processor 102 to search one or more data sources, for example, sources 21-28 and/or other information repositories for other context data according to user preferences defined in the request.

Figure 6:
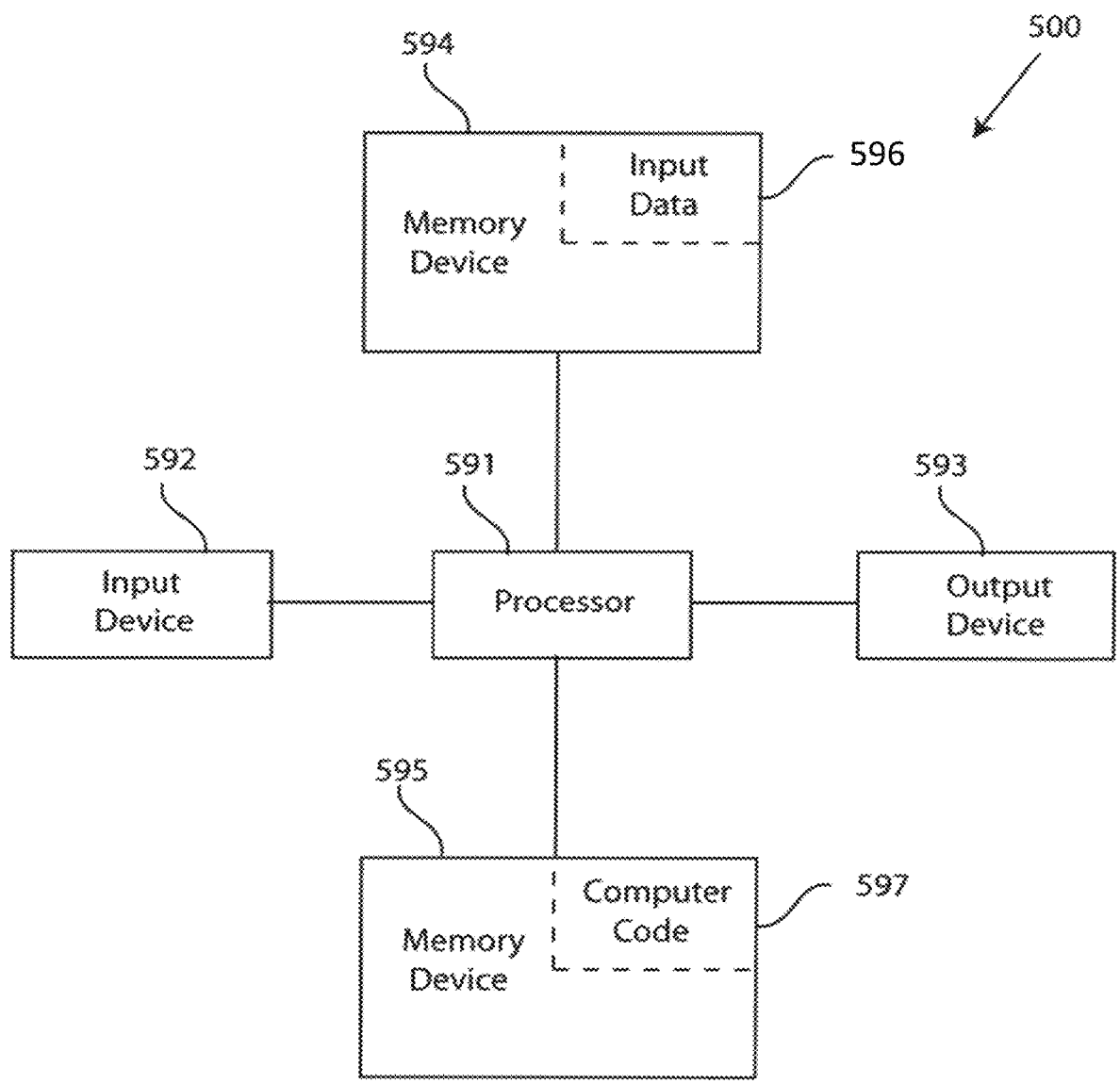
FIG. 6 illustrates a block diagram of a computer system, in accordance with embodiments of the present invention.

FIG. 6 illustrates a block diagram of a computer system 500 that may be included in the system of FIG. 1 and the methods illustrated in FIGS. 2-4 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method, in the manner prescribed by one or more elements of the system and methods described with respect to FIGS. 1-4, wherein the instructions of the computer code 597 may be executed by processor 591 via memory device 595. The computer code 597 may include software or program instructions that may implement one or more algorithms for implementing the methods of providing a result, as described in detail above. The processor 591 executes the computer code 597. Processor 591 may include a single processing unit or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random-access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository, for example, part of one or more elements of the computing architecture as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to cognitive computer systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of automated gift determination, gift selection according to an intended recipient's emotional state, and so on. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for providing an availability recommendation.

A computer program product of the present invention comprises one or more processors of a computer system to implement the methods of the present invention.

A computer system of the present invention comprises one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
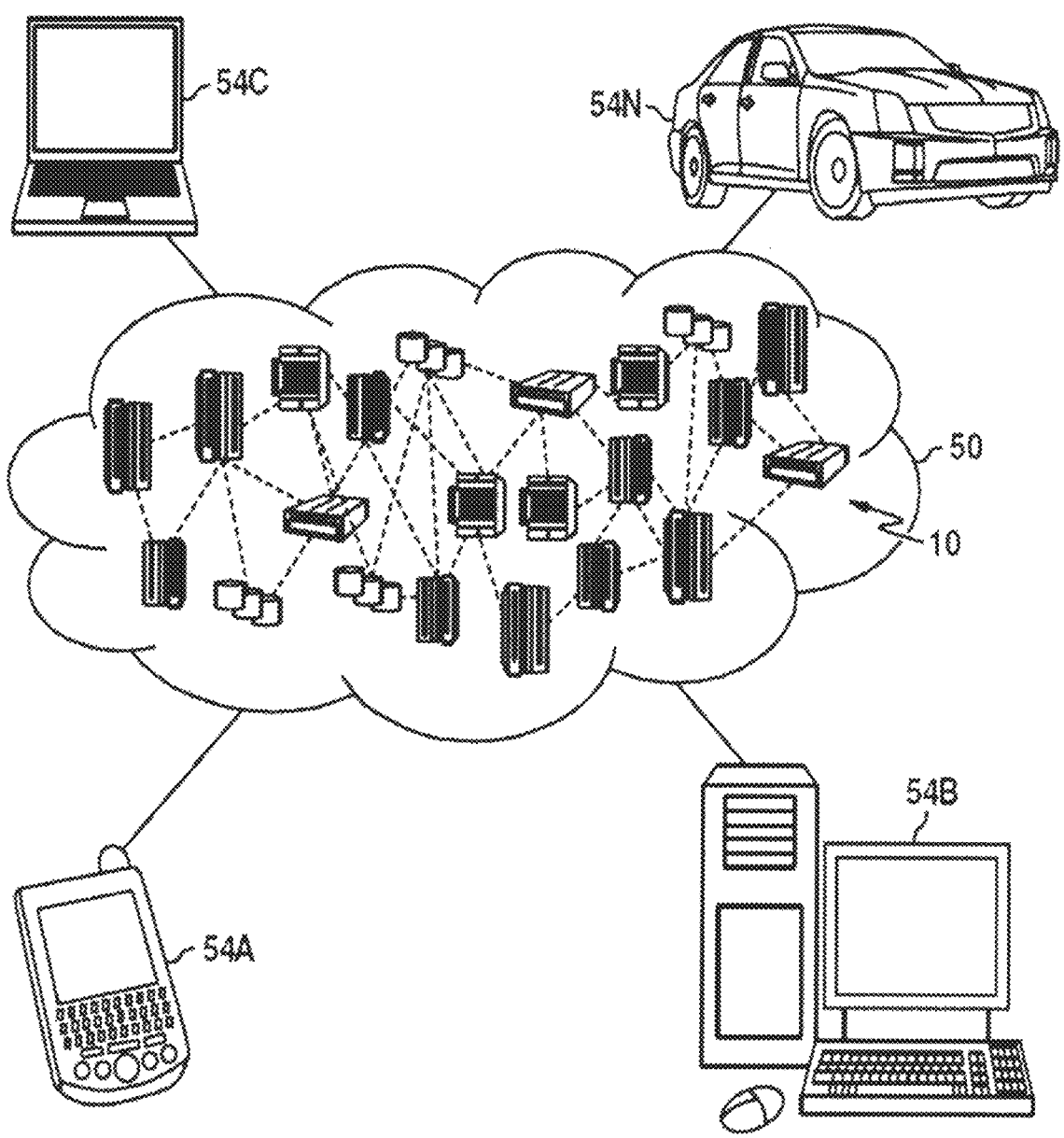
FIG. 7 depicts a cloud computing environment, in accordance with embodiments of the present invention.
Figure 8:
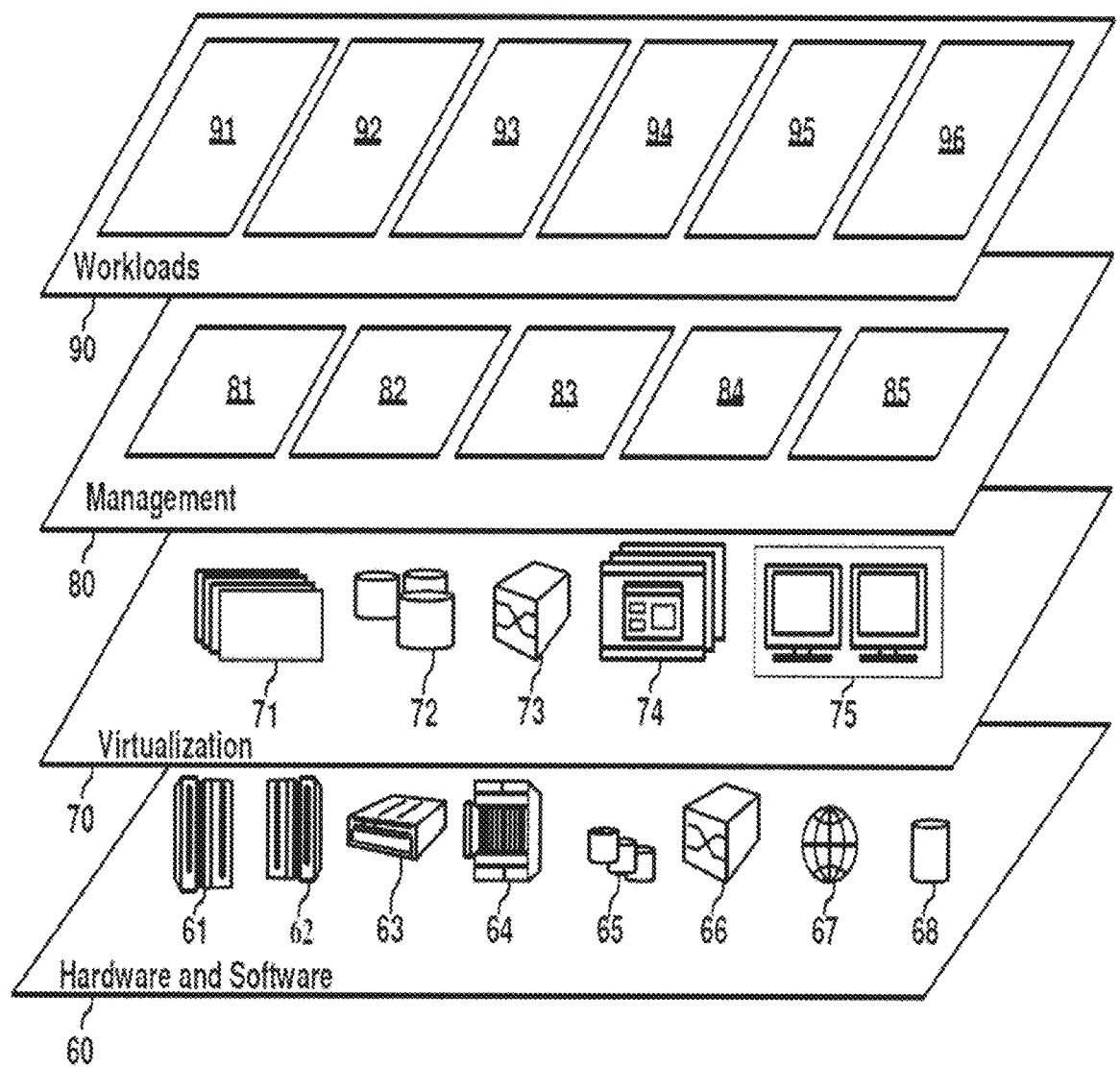
FIG. 8 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API management or the like 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for processing an electronic communication, comprising:
    receiving, by a communication processing system, data regarding an incoming communication output from a computing device of a communication initiator and directed to a computing device of a communication recipient;
    performing a data search, by a cognitive search processor of the communication processing system, of one or more data sources, for context information regarding at least one of the communication initiator or the communication recipient;
    aggregating, by the communication processing system, collected context information in response to performing the data search;
    determining from the aggregated collected context information an intent of the communication initiator;
    generating and formatting contact context data including information in response to determining the intent of the communication initiator of the incoming communication for output to the computing device of the communication recipient; and
    activating a mode selector in response to a display option from the computing device, the mode selector distinguishing and selecting between a proactive mode and a real-time mode by outputting a data command instruction to a contact context data formatter or a cognitive search processor, respectively, and further controlling an output of context data for the display option depending on whether the proactive mode is selected where the cognitive search processor provides a prediction result in response to a determination of the intent of the communication initiator regarding the incoming communication, or whether the real-time mode is selected where the contact context data formatter controls the output of real-time information about one or more electronic communications that includes the incoming communication based on the aggregated collected context information.

2. The method of claim 1, further comprising: outputting, by the communication processing system, a subset of the contact context data to the computing device of the communication recipient in compliance with a format supported by the computing device of the communication recipient.

3. The method of claim 2, further comprising: outputting, by the communication processing system, an additional set of contact context data of the contact context data to an additional electronic computing device in compliance with supported display features of the additional electronic computing device.

4. The method of claim 2, further comprising distinguishing and responding to a selection between the proactive mode, the real-time mode, and a share mode to synchronize the computing device of the communication recipient and the additional electronic computing device.

5. The method of claim 4, further comprising: outputting the data command instruction to the computing device of the communication recipient pursuant to the share mode to display a selection feature of the display option that synchronizes the computing device of the communication recipient and the at least one other computing device.

6. The method of claim 1, wherein the proactive mode includes predicting by the communication processing system the communication initiator, and wherein the method further comprises accessing the one or more available data sources in response to a receipt by the instruction to operate in the proactive mode.

7. The method of claim 1, wherein the real-time mode includes a receipt by the computing device of the communication recipient of real-time or near real-time context data regarding the incoming communication or a communication exchange after acceptance of the incoming communication.

8. The method of claim 4, wherein the share mode includes an exchange of the contact context data between the computing device of the communication recipient and at least one other computing device.

9. The method of claim 1, further comprising:
    displaying a subset of the contact context data of the contact context data that includes aggregated data regarding the communication recipient, a subset of the contact context data displayed at the computing device of the communication initiator according to predetermined security parameters defined by the communication recipient.

10. A method for processing an electronic communication, comprising:
  receiving, by a communication processing system, data regarding an incoming communication output from a computing device of a communication initiator and directed to a computing device of a communication recipient;
  performing a data search, by the communication processing system, of one or more data sources for context information regarding at least one of the communication initiator or the communication recipient;
  aggregating, by the communication processing system, collected context information in response to performing the data search;
  determining from the aggregated collected context information an intent of the communication initiator;
  populating a data record including contact context data of the aggregated context information; and
  activating a mode selector in response to a display option from the computing device, the mode selector distinguishing and selecting between a proactive mode, a real-time mode, and a share mode by outputting a data command instruction to a contact context data formatter or a cognitive search processor, respectively, and further controlling an output of context data for the display option depending on whether the proactive mode is selected where the cognitive search processor provides a prediction result in response to a determination of the intent of the communication initiator regarding the incoming communication, or whether the real-time mode is selected where the contact context data formatter controls the output of real-time information about one or more electronic communications that includes the incoming communication based on the aggregated collected context information; or whether the share mode is activated where the contents of the data record are shared with the computing device of a communication recipient and with at least one other computing device, each of the computing device and the at least one other computing device having a different display requirement, and each receiving the shared contents of the data record according to the different display requirements.

11. The method of claim 10, further comprising: processing the contact context data for complying with supported display features of the computing device and the other computing device of the communication recipient.

12. The method of claim 10, wherein the contact context data is constructed and arranged to be independent of ecosystem, device manufacturer, operating system, or service provider.

13. The method of claim 10, further comprising: outputting the data command instruction to the computing device of the communication recipient pursuant to the share mode to display a selection feature of the display option that synchronizes the computing device of the communication recipient and the at least one other computing device.

14. The method of claim 10, wherein the proactive mode includes predicting by the communication processing system the communication initiator, and wherein the method further comprises accessing the one or more available data sources in response to a receipt by the instruction to operate in the proactive mode.

15. The method of claim 10, wherein the real-time mode includes a receipt by the computing device of the communication recipient of real-time or near real-time context data regarding the incoming communication or a communication exchange after acceptance of the incoming communication.

16. The method of claim 10, wherein the share mode includes an exchange of the contact context data between the computing device of the communication recipient and at least one other computing device.

17. The method of claim 10, further comprising:
  displaying a subset of the contact context data of the contact context data that includes the aggregated data, the subset of the contact context data displayed at the computing device of the communication initiator according to predetermined security parameters defined by the communication recipient.

18. A computer system, comprising:
  a processor;
  a memory device coupled to the processor;
  one or more remote computer servers in communication with the processor; and
  a computer readable storage device coupled to the processor, wherein the storage device contains program code executable by the processor via the memory device to implement a method for processing an electronic communication, comprising:
    receiving, by a processor, data regarding an incoming communication output from a computing device of a communication initiator and directed to a computing device of a communication recipient;
    performing, by a cognitive search processor, a data search of one or more data sources for context information regarding at least one of the communication initiator or the communication initiator;
    aggregating, by a processor, collected context information in response to performing the data search;
    determining, by a processor, from the aggregated collected context information an intent of the communication initiator;
    generating and formatting by a processor contact context data including information in response to determining the intent of the communication initiator of the incoming communication for output to the computing device of the communication recipient; and
    activating a mode selector in response to a display option from the computing device, the mode selector distinguishing and selecting between a proactive mode and a real-time mode by outputting a data command instruction to a contact context data formatter or the cognitive search processor, respectively, and further controlling an output of context data for the display option depending on whether the proactive mode is selected where the cognitive search processor provides a prediction result in response to a determination of the intent of the communication initiator regarding the incoming communication, or whether the real-time mode is selected where the contact context data formatter controls the output of real-time information about one or more electronic communications that includes the incoming communication based on the aggregated collected context information.

19. The computer system claim 18, wherein the storage device contains program code executable by the processor via the memory device to implement the method for processing an electronic communication further comprising outputting an instruction to the communication processing system to operate in one of a proactive mode, a real-time mode, or a share mode.

* * * * *